(12) United States Patent
Takahashi et al.

(10) Patent No.: US 8,951,331 B2
(45) Date of Patent: Feb. 10, 2015

(54) VALUABLE METAL RECOVERY METHOD

(75) Inventors: Jun-ichi Takahashi, Ehime (JP);
Kazuhiro Mori, Ehime (JP); Toshirou Tan, Ehime (JP)

(73) Assignee: Sumitomo Metal Mining Co. Ltd, Tokyo (JP)

( * ) Notice: Subject to any disclaimer, the term of this patent is extended or adjusted under 35 U.S.C. 154(b) by 0 days.

(21) Appl. No.: 13/985,724

(22) PCT Filed: Feb. 15, 2012

(86) PCT No.: PCT/JP2012/053476
§ 371 (c)(1),
(2), (4) Date: Jan. 3, 2014

(87) PCT Pub. No.: WO2012/111690
PCT Pub. Date: Aug. 23, 2012

(65) Prior Publication Data
US 2014/0174256 A1    Jun. 26, 2014

(30) Foreign Application Priority Data
Feb. 18, 2011    (JP) .................. 2011-033177

(51) Int. Cl.
*C22B 1/00* (2006.01)
*H01M 10/54* (2006.01)
(Continued)

(52) U.S. Cl.
CPC .............. *H01M 10/54* (2013.01); *C22B 1/005* (2013.01); *C22B 1/02* (2013.01); *C22B 7/004* (2013.01); *H01M 10/0525* (2013.01); *Y02E 60/122* (2013.01)
USPC ................................. 75/414; 75/581; 75/626

(58) Field of Classification Search
CPC .......... C22B 1/04; C22B 7/001; H01M 10/54
USPC ............................................. 75/414
See application file for complete search history.

(56) References Cited

U.S. PATENT DOCUMENTS

| 6,228,143 B1 * | 5/2001 | Aiken et al. .................... 75/403 |
| 7,169,206 B2 | 1/2007 | Cheret et al. |
| 2009/0095127 A1 * | 4/2009 | Patterson .................... 75/10.18 |

FOREIGN PATENT DOCUMENTS

| CN | 201203345 Y * | 3/2009 |
| EP | 1981115 A1 | 10/2008 |

(Continued)

OTHER PUBLICATIONS

Machine translation of JP 10-088250A by Kase. Published Apr. 1998.*

(Continued)

*Primary Examiner* — George Wyszomierski
*Assistant Examiner* — Tima M McGuthry Banks
(74) *Attorney, Agent, or Firm* — Edwards Wildman Palmer LLP; Jeffrey D. Hsi

(57) ABSTRACT

Provided is a method for stabilizing the degree of oxidation of molten battery waste, and definitively separating slag and alloy. The method is provided with a pre-oxidation step (ST20) for roasting and oxidizing battery waste; and a drying step (S20) for melting the battery waste oxidized in the pre-oxidation step, and separating and recovering the slag and the valuable metal alloy. By providing the pre-oxidation step (ST20) for oxidizing the battery waste by roasting in advance of the drying step (S20), it is possible to stably obtain the optimal degree of oxidization in a melting step (ST21), and to improve the slag-alloy separation efficiency.

11 Claims, 3 Drawing Sheets

(51) Int. Cl.
*C22B 1/02* (2006.01)
*C22B 7/00* (2006.01)
*H01M 10/0525* (2010.01)

(56) References Cited

FOREIGN PATENT DOCUMENTS

| JP | 04-128324 A | | 4/1992 | | |
| JP | H07-245126 A | | 9/1995 | | |
| JP | 10-060551 A | | 3/1998 | | |
| JP | 10088250 A | * | 4/1998 | ................ | C22B 7/00 |
| JP | 10-158751 A | | 6/1998 | | |
| JP | 10158751 A | * | 6/1998 | ................ | C22B 7/00 |
| JP | 10-330855 A | | 12/1998 | | |
| JP | 2000-067935 A | | 3/2000 | | |
| JP | 2010-231925 A | | 10/2010 | | |

OTHER PUBLICATIONS

Machine translation of JP 10-158751 A by Abe et al. Published Jun. 1998.*
Machine translation of CN 201203345 Y by Feng et al. Published Mar. 2009.*
Extended European Search Report of EP Application No. 12747836.0 dated Dec. 13, 2013.
International Search Report of PCT/JP2012/053476 dated May 1, 2012.

* cited by examiner

VALUABLE METAL RECOVERY METHOD

CROSS-REFERENCE TO RELATED APPLICATIONS

This application is the national phase under 35 U.S.C. §371 of PCT International Application No. PCT/JP2012/053476, filed Feb. 15, 2012, which claims the benefit of Japanese Patent Application No. 2011-033177, filed Feb. 18, 2011, the entire contents of the aforementioned applications are hereby incorporated herein by reference.

TECHNICAL FIELD

The invention relates to a method for efficiently recovering valuable metals from waste batteries, such as lithium-ion batteries.

BACKGROUND ART

Processes for recycling used or in-process defective batteries (hereinafter referred to as "waste batteries"), such as waste lithium-ion batteries, and recovering their valuable metals are broadly divided into dry and wet processes.

A dry process includes melting crushed waste batteries, separating valuable metals, which are to be recovered, from other less valuable metals and materials by harnessing the difference in oxygen affinity between them, and recovering the valuable metals. Specifically, such a dry process includes oxidizing less valuable elements, such as iron, as much as possible to form slag and suppressing the oxidation of valuable materials, such as cobalt, as much as possible to recover the valuable materials in the form of an alloy.

For example, Patent Document 1 discloses a method using a high-temperature heating furnace, in which a flux is added to waste batteries, and slag is repeatedly treated so that valuable metals such as nickel and cobalt can be recovered at a rate of around 80%.

Patent Document 1: U.S. Pat. No. 7,169,206

DISCLOSURE OF THE INVENTION

Problems to be Solved by the Invention

When waste batteries are oxidized in a melting step in a dry treatment process, there are significant variations between treated batches because a large number of different materials have to be oxidized. Thus, there is a problem in that even though the same amount of oxygen is added in order to properly control the degree of oxidation of each material in the melt, it is difficult to obtain, every time in the same manner, a proper degree of oxidation of each material, which results in that valuable metals cannot be stably recovered.

More specifically, there is a problem in that it is particularly difficult to control the degree of oxidation of carbon (C), among the large number of different materials in the melt, during the melting step. In general, waste lithium-ion batteries contain carbon as an anode material, which is located near the centre of the waste batteries. This makes it difficult to strictly control the oxidation of carbon in the melting step and can easily cause variations in the degree of oxidation. In some cases, the variations interfere with the acceleration of proper oxidation of other materials in the melt or interfere with the suppression of the oxidation, and thus make the whole oxidation process unstable. For stable recovery of valuable metals, therefore, it is necessary to achieve stable oxidation of carbon.

The invention has been made to solve the problems mentioned above, and an object of the invention is to provide a valuable metal recovery method capable of stably increasing the rate of recovery of valuable metals from waste batteries through a dry process.

Means for Solving the Problems

The inventors have drawn up the invention used on the finding that when a pre-oxidation step, in which waste batteries are oxidized by roasting in advance, is performed before a dry step, oxidation can be suppressed optimally and stably. More specifically, the invention provides the following.

(1) A method for recovering a valuable metal from a waste battery, including: a pre-oxidation step including subjecting the waste battery to an oxidation treatment by roasting the waste battery; and a dry step including melting the waste battery after the pre-oxidation step to separate and recover slag and an alloy of valuable metals.

(2) The valuable metal recovery method according to item (1), wherein the pre-oxidation step is performed at 600° C. to 1,250° C.

(3) The valuable metal recovery method according to item (1) or (2), further including an additional oxidation step including performing an additional oxidation treatment in a melting step in the dry step.

(4) The valuable metal recovery method according to any one of items (1) to (3), wherein a kiln is used in the oxidation treatment in the pre-oxidation step.

(5) The valuable metal recovery method according to any one of items (1) to (4), wherein the waste battery is a lithium-ion battery.

Effects of the Invention

According to the invention, the method for recovering a valuable metal from a waste battery includes a pre-oxidation step to perform an oxidation treatment before a dry step and thus makes it possible to achieve, in the melting step, stable control of the degree of oxidation, which has been difficult in conventional processes, and also makes it possible to stably recover valuable metals at a high recovery rate.

PREFERRED MODE FOR CARRYING OUT THE INVENTION

Figure 1:
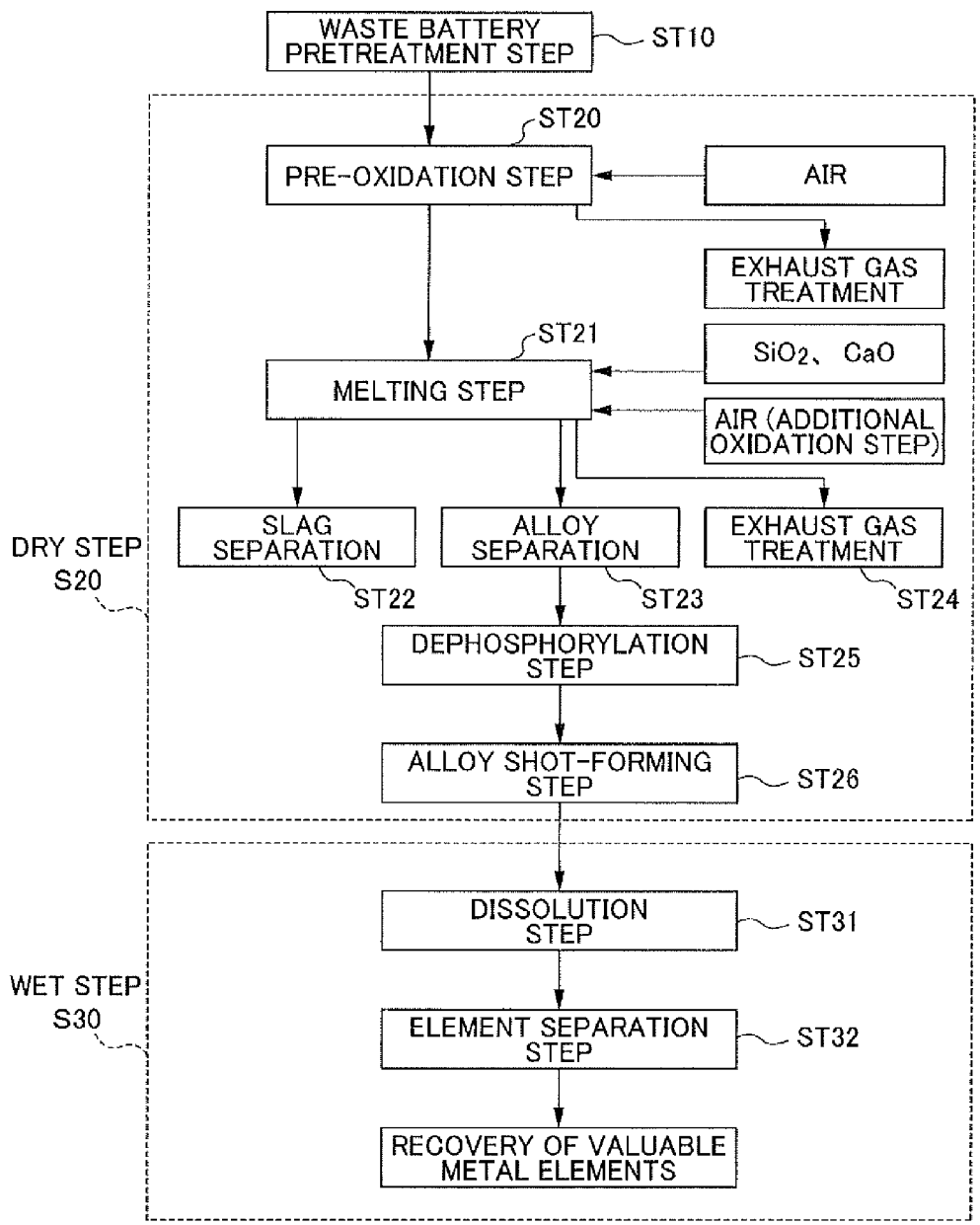
FIG. 1 is a flow chart showing an example of the invention, specifically, a method for recovering valuable metals from waste batteries.

Hereinafter, an embodiment of the invention will be described with reference to the drawings. FIG. 1 is a flow chart showing an example of a method for recovering valuable metals from waste batteries. In this embodiment, a case where the waste batteries are lithium-ion batteries is described, which, however, is not intended to be restrictive for the invention.

Whole Process

As shown in FIG. 1, this valuable metal recovery method includes a waste battery pretreatment step ST10, a pre-oxidation step ST20, a dry step S20, and a wet step S30. Thus, the valuable metal recovery method according to this embodiment is a total process including obtaining an alloy in the dry step S20 and then separating and recovering valuable metal elements using the wet step S30. As used herein, the term "waste battery" is intended to include not only a used battery but also others, such as in-process defect batteries. We also do not intend to exclude adding metal, resin, or any other material apart from waste batteries, as needed, as long as the object to be processed contains a waste battery. In such a case, metal, resin, or any other material is encompassed by the term "waste battery" in the invention.

Waste Battery Pretreatment Step ST10

The waste battery pretreatment step ST10 is performed to prevent waste batteries from exploding. Waste batteries are closed systems and contain an electrolytic solution or the like inside them. Thus, subjecting them to a dry inciting process as they are involves a risk of explosion and is dangerous. Therefore, gas-venting holes need to be formed in some way.

The waste battery pretreatment step ST10 may be performed using any specific method. For example, holes may be mechanically formed in waste batteries using a needle-shaped cutting edge. In the invention, it is not necessary to separate or process individual parts because a melting step is performed in the later dry process.

Pre-Oxidation Step ST20

The pre-oxidation step ST20 will be described, which is a feature of the invention. The pre-oxidation step ST20 includes roasting the pre-treated waste batteries, which are obtained in the waste battery pretreatment step ST10, at a temperature of 600° C. to 1,250° C. while supplying oxygen, so that the pre-treated waste batteries are oxidized. In conventional valuable metal recovery methods, oxidation is performed in a melting step in a dry step. In contrast, the valuable metal recovery method of the invention is characterized by performing a pre-oxidation treatment in the pre-oxidation step ST20 in advance of the melting step ST21.

In the dry step S20, the pre-oxidation treatment is performed at a stage prior to the melting step ST21. The pre-oxidation treatment is performed in a pre-oxidation furnace provided separately from the melting furnace in which the melting step ST21 is performed. A kiln may be used as the pre-oxidation furnace. As an example, a rotary kiln, which is conventionally used in cement manufacture and so on, is preferably used. Hereinafter, therefore, an embodiment of the invention using a rotary kiln as a typical example of the kiln will be described in detail. It will be understood, however, that the kiln is not restricted to a rotary kiln in the invention. Any other kiln, such as a tunnel kiln (hearth furnace) may be used, and the term "kiln" is intended to include every type of kiln capable of performing the pre-oxidation step ST20, which includes roasting waste batteries while supplying oxygen so that the waste batteries can be oxidized in its inside.

Figure 2:
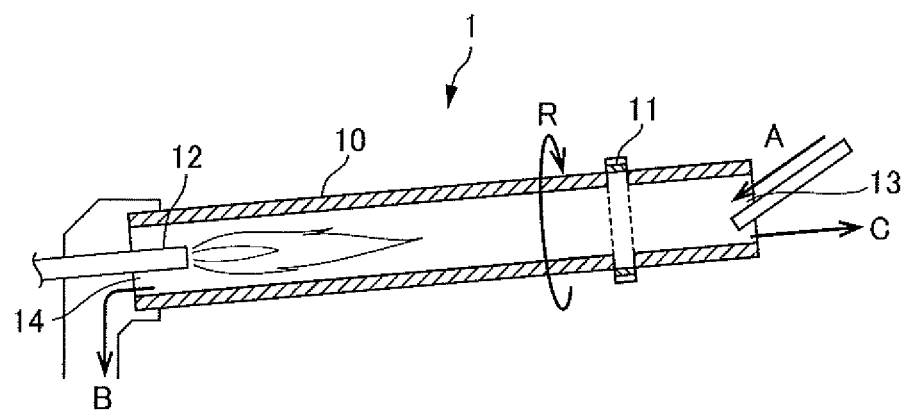
FIG. 2 is a schematic cross-sectional view showing how to use a kiln in an oxidation treatment during the pre-oxidation step according to the invention.

In this embodiment, the pre-oxidation step ST20 is performed using a kiln 1 shown in FIG. 2 as the pre-oxidation furnace. As shown in FIG. 2, the kiln has a main body 10, which is a cylindrical, rotary kiln made of 15-30 mm carbon steel or the like. Its inside has a lining of firebricks or the like. The outside of the kiln main body 10 is provided with a driving gear 11 for transmitting a rotational force to the kiln main body 10. The inside of the kiln main body is provided with a burner pipe 12 that blows hot air to heat the inside. When used, the kiln main body 10 provided with these parts is set at an incline of 3 to 4% relative to the horizontal plane.

In the pre-oxidation step ST20 using the kiln 1, the inside of the kiln main body 10 is first heated to a temperature of 600 to 1,250° C. with hot air blown from the burner pipe 12. Waste batteries are then fed in the direction A through a feed inlet 13 while the kiln main body 10 is rotated in the direction R by means of the driving gear 11. The waste batteries move inside the kiln main body 10 toward an outlet 14 while they are agitated and roasted along the incline of the kiln main body 10. In this process, if the temperature inside the kiln main body 10 is less than 600° C., the oxidation cannot proceed sufficiently, which is not preferred. If the temperature inside the kiln main body 10 exceeds 1,250° C., iron and other materials generally used in the outer shells of the waste batteries will be partially molten to adhere to the inner wall of the kiln main body 10, which may interfere with smooth operation or lead to degradation of the kiln itself and thus is not preferred.

An oxidizing agent, such as air, is introduced into the kiln main body 10 in order to increase the rate of recovery of nickel, cobalt, and copper by controlling the degree of oxidation of the waste batteries, which move inside the kiln main body 10 while being roasted at the temperature specified above. For example, foliated aluminium is used in the cathode materials of lithium-ion batteries. Carbon is also used in the anode materials of lithium-ion batteries. Batteries also have outer shells made of iron or aluminium, and plastics are used in outer packages of battery pack. These materials basically act as reducing agents. Thus, the total reaction to convert these materials to gas and slag will be an oxidation reaction. Therefore, it is necessary to introduce oxygen into the kiln main body 10. Because of this, air is introduced in the pre-oxidation step ST20.

Although the oxidizing agent is not restricted, air, pure oxygen, oxygen-rich gas, or any other oxygen-containing as is preferably used because it is easy to handle. In the pre-oxidation step ST20, the gas is directly supplied into the kiln main body 10. As a guide, the amount of the oxidizing agent to be introduced should be about 1.2 times the chemical equivalent required to oxidize each material to be subjected to the oxidation treatment.

The waste batteries oxidized through this process are discharged in the direction B from the outlet 14. The exhaust gas generated in the process of the oxidation treatment is discharged in the direction C.

In the pre-oxidation step ST20 according to the invention, the reaction rate is relatively low, because in this step, the oxidation treatment is performed at a temperature lower than the temperature at which an oxidation treatment would otherwise be performed in the melting step ST21. In addition, the process of oxidizing the waste batteries moving inside the kiln main body 10 with a specific amount of oxygen being introduced into the space of the cylindrical kiln main body 10 makes it easy to control oxidation by controlling the amount of oxygen, the time and temperature of oxidation, or other factors. Carbon often interferes with the reliability of the whole oxidation treatment. In contrast to the oxidation treatment performed in the melting step in the dry step, however, oxidation of carbon can be easily controlled in the pre-oxidation step ST20. More specifically, in the pre-oxidation step ST20, the oxidation treatment may be performed until almost the entire amount of carbon is oxidized. This makes it possible to reduce fluctuations in the next melting step ST21, which would otherwise be caused by unoxidized carbon, and thus also makes it possible to strictly control the degree of oxidation of iron and cobalt.

The oxidation of the main elements constituting the waste battery materials depends on the difference in affinity for oxygen, which generally follows the order: aluminium>lithium>carbon>manganese>phosphorus>iron>cobalt>nickel>copper. In other words, aluminium is the most vulnerable to oxidation, while copper is the most resistant to oxidation. To increase the rate of recovery of cobalt, nickel, and copper, which have a relatively low affinity for oxygen, the pre-oxidation step ST20 is required to achieve strict control of the degree of oxidation in such a manner that the degree of oxidation of iron is increased while the oxidation of cobalt is suppressed, although the oxygen affinities of iron and cobalt are close to each other. As mentioned above, the degree of oxidation can be controlled more strictly in the pre-oxidation step ST20 than in the oxidation treatment performed in the melting step in the dry step. A feature of the invention is that based on this, the rate of recovery of valuable metals from waste batteries can be increased stably.

When molten waste batteries are oxidized in a dry step, oxygen bubbling is performed as a common inexpensive method, in which straw-like cylinders made of an iron-based material, called lances, are inserted into the melt. In this method, however, the melting temperature is as high as over 1,400° C., and thus the consumption rate is high because the lances become molten. This increases the replacement frequency and causes the problem of lower work efficiency and higher lance cost. The pre-oxidation step ST20, which is roasting, also has the advantage that the problem of lance consumption does not occur.

Dry Step S20

The dry step S20 includes performing a melting step ST21 including melting the waste batteries at around 1,500° C., which batteries have been oxidized in the pre-oxidation step ST20. The melting step ST21 can be performed in a conventionally known electric furnace or the like.

In the valuable metal recovery method of the invention, the waste batteries molten in the dry step do not have to be oxidized as in conventional techniques because an oxidation treatment is already performed in the pre-oxidation step ST20.

However, in a case where the oxidation is not enough in the pre-oxidation step ST20 or other cases where the degree of oxidation needs to be modified, the melting step ST21 may include an additional oxidation step in which an additional oxidation treatment is performed for a minute period of time. This additional oxidation step makes it possible to control the degree of oxidation more properly and finely. In addition, the additional oxidation step can be performed in a shorter time than the conventional oxidation treatment in the melting process. Thus, the additional oxidation step has a less adverse effect on work efficiency and is less likely to cause the problem of cost increase because the consumption of lances can be reduced.

Additionally, in the melting step ST21, $SiO_2$ (silicon dioxide) and CaO (lime) or other materials are added as fluxes to lower the melting point of slag to be separated in the slag separation ST22 described below. It should be noted that the fluxes does not always have to be added in the melting step ST21. Alternatively, the fluxes may be added in the pre-oxidation step ST20 before the melting step ST21 so that the same effect can be obtained.

The melting step ST21 produces an alloy of valuable metals, such as nickel, cobalt, and copper, and also produces slag, which is an oxide of iron, aluminium, and the like. Both products, which have different specific gravities, are recovered in slag separation ST22 and alloy separation ST23, respectively. In this process, if the content of aluminium oxide in the slag is relatively high, the slag can have relatively high melting point and high viscosity. As mentioned above, however, in the melting step ST21, $SiO_2$ and CaO are added to lower the melting point of the slag, so that the slag with a lower melting point can have lower viscosity. Thus, the slag separation ST22 can be efficiently performed. Dust, exhaust gas, and other exhaust products in the melting step ST21 are processed to be harmless in a conventionally known exhaust gas treatment step ST24.

After alloy separation ST23 is performed, the resulting alloy is further subjected to a dephosphorylation step ST25. In lithium-ion batteries, ethylene carbonate, diethyl carbonate, or other organic solvents are used, and $LiPF_6$ (lithium hexafluorophosphate) or other electrolytes are used. The phosphorus in $LiPF_6$ tends to be relatively easily oxidized, but also tends to have a relatively high affinity for iron group elements such as iron, cobalt, and nickel. Phosphorus in the alloy is difficult to remove by the wet step, which is a later step for recovering each element in the form of metal from the alloy obtained in the dry process, and phosphorus is also accumulated as an impurity in the treatment system, which makes it difficult to continue the process. Thus, phosphorus is removed in the dephosphorylation step ST25.

More specifically, lime or other materials capable of reacting to produce CaO are added, and oxygen-containing gas such as air is blown in so that phosphorus in the alloy can be oxidized and absorbed into the CaO.

When the waste batteries are lithium-ion batteries, the alloy obtained in this manner contains, as main components, cobalt or nickel derived from the cathode materials, lithium derived from electrolytes, and copper derived from the anode materials, etc.

Alloy Shot-Forming Step S26

In this embodiment, the alloy is cooled and obtained in the form of grains (also referred to as "shot-shaped alloy" or simply "shots") at the end of the dry step S20. This makes it possible to perform a dissolution step ST31 in a short period of time in the later wet step S30.

As described below, when the dry step is performed as a pretreatment in a wide sense, an alloy with fewer impurities can be obtained, and the amount of the material to be introduced into and treated in the wet step can be significantly reduced, so that a combination of the dry step and the wet step can work effectively. However, the wet step is a complicated process and basically unsuitable for high-throughput procedures. Thus, to use the wet step in combination with the dry step, the processing time of the wet step needs to be short, and in particular, the dissolution step ST31 needs to be performed in a short period of time. This problem can be solved by forming the alloy into grains so that the dissolution time can be reduced.

In this step, the grain preferably has an average surface area in the range of 1 $mm^2$ to 300 $mm^2$ and an average weight in the range of 0.4 mg to 2.2 g. If the surface area or the weight is less than the lower limit of the range, a problem may occur in which the particles are too small and thus difficult to handle and a reaction occurs too rapidly so that it will be difficult to dissolve the particles at a time due to too much heat generation, which is not preferred. If the surface area or the weight is more than the upper limit of the range, the rate of dissolution in the later wet step can undesirably decrease. The alloy can be made in the form of shots or formed into grains using a conventionally known method of pouring the molten metal into running water to rapidly cool it.

Wet Step S30

In a process of recovering valuable metals from waste batteries, the alloy recovered as described in Patent Document 1 is not valuable, and thus valuable metal elements must be recovered. When waste batteries are pretreated by the dry step so that an alloy of only valuable metals is obtained as described above, the later wet step can be simplified. In this case, the throughput of the wet step can be reduced to about ¼ to ⅓ (weight ratio) of the amount of the input waste batteries. This also makes the use of the wet step in combination advantageous.

Using the dry step as a pretreatment in a wide sense as described above makes it possible to obtain an alloy with fewer impurities and to significantly reduce the throughput. Thus, the invention makes possible a combination of the dry step and the wet step on an industrial scale.

The wet step is not restricted and may be performed using a conventionally known method. An example of the wet step is as follows. When the waste batteries are lithium-ion batteries and specifically when an alloy of cobalt, nickel, copper, and iron is produced, the alloy is subjected to dissolution with acid (the dissolution step ST31), and then an element separation step ST32 is performed, in which deironization, separation and recovery of copper, nickel/cobalt separation, recovery of nickel, and recovery of cobalt are conducted in this order, so that valuable metal elements are successfully recovered.

Throughput

In a conventional total process including a combination of a dry step and a wet step, oxidation in the dry step is performed when waste batteries are in a molten state. To control the degree of oxidation properly in the oxidation process, the melting step in the dry step of the conventional process must be a batch process, so that a new step must be performed from the beginning after the oxidation of all waste batteries, which are processed at the same time in a melting furnace, is completed. The valuable metal recovery method of the invention enables a higher throughput than conventional techniques because in the method of the invention, waste batteries having previously undergone oxidation in the pre-oxidation step ST20 can be continuously introduced into the melting furnace so that they can be continuously processed in the dry step. The invention is suitable for use in cases where the throughput is at least 1 t per day, preferably at least 10 t per day.

The waste batteries may be of any type. Preferred examples of the object to be processed according the invention are lithium-ion batteries, from which rare metals such as cobalt and nickel can be recovered, and whose applications expand to include automobile batteries and others, so that large-scale recovery processes will be necessary for them.

EXAMPLES

Hereinafter, the invention will be more specifically described with reference to examples and comparative examples. It will be understood that the examples described below are not intended to limit the invention.

Examples of the invention will be first described. In Examples 1 to 6, a pre-oxidation treatment was performed in a pre-oxidation step before a melting step, and then a melting treatment was performed in the melting step.

In each of the examples, the pre-oxidation step was performed as follows. In an alumina crucible, 21 to 25 g of a waste lithium-ion battery (hereinafter referred to as the "sample") was held at a temperature of 900° C., 1,100° C., or 1,200° C. (as shown in Table 1) for 30 minutes by heating in an nitrogen atmosphere, while each predetermined amount of oxygen (shown in Table 1) was blown into the crucible through an alumina tube, so that a pre-oxidation treatment was performed. However, in Example 2, a predetermined amount of air was blown instead of the oxygen.

TABLE 1

|  |  | Example |  |  |  |  |  | Comparative Example |  |  |  |
|---|---|---|---|---|---|---|---|---|---|---|---|
| Test No |  | 1 | 2 | 3 | 4 | 5 | 6 | 1 | 2 | 3 | 4 |
| Pre-oxidation step | Temperature ° C. | 1100 | 1200 | 1100 | 1100 | 900 | 1100 | 1100 | 900 | 900 | 1300 |
|  | Oxygen amount (L) | 12.5 | 11.0 | 11.0 | 10.0 | 9.5 | 6.0 | — | — | — | 11.0 |
| Melting step | Temperature ° C. | 1450-1500° C. | | | | | | | | | |
|  | Oxygen amount (L) | — | — | — | — | — | — | 10.0 | 6.5 | 6.0 | — |
| Ratio of distribution to alloy | Fe | 34% | 40% | 45% | 49% | 86% | 92% | 91% | 83% | 75% | — |
|  | Co | 78% | 91% | 92% | 90% | 96% | 98% | 65% | 45% | 59% | — |

Subsequently, in the inciting step, 7.2 g of a flux mixture with a $SiO_2$/CaO ratio of 1 was added to the sample oxidized by the pre-oxidation treatment in the alumina crucible, and then the sample was molten at a temperature in the range of 1,450° C. to 1,500° C. (as shown in Table 1) by heating in a nitrogen atmosphere and held at this temperature for 1 hour to perform a melting treatment. In this process, oxygen blowing was not performed.

Figure 3:
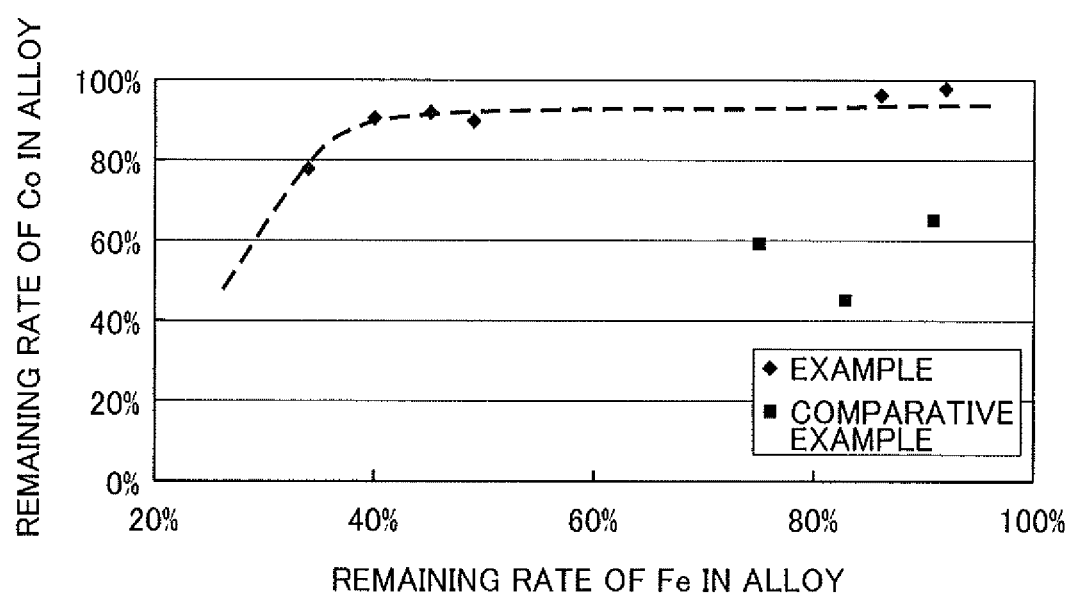
FIG. 3 is a graph showing the distribution ratios of metallic iron and metallic cobalt in an alloy in examples and comparative examples.

Subsequently, the sample was cooled in the furnace. After the cooling, the resulting slag and alloy were separated and recovered. Table 1 and FIG. 3 show the distribution ratios (% by weight) of metallic iron and metallic cobalt in the alloy, which were determined by analysis using the ICP method.

Next, comparative examples will be described. In Comparative Examples 1 to 3, a melting step was performed with no pre-oxidation treatment, and an oxidation treatment was performed in the melting treatment. In Comparative Example 4, a pre-oxidation treatment was performed at a temperature of 1,300° C.

In each of Comparative Examples 1 to 3, the first step was as follows. In an alumina crucible, the same amount of the sample as in the examples was held at a temperature of 900° C. or 1,100° C. (as shown in Table 1) for 30 minutes by heating in a nitrogen atmosphere in the same manner as in the examples. In contrast to the examples, however, oxygen blowing, namely, the pre-oxidation treatment was not performed in this step.

Subsequently, in the melting step, 7.2 g of a flux mixture with a $SiO_2$/CaO ratio of 1 was added to the sample in the alumina crucible, and then the sample was molten at a temperature in the range of 1,450° C. to 1,500° C. (as shown in Table 1) by heating in a nitrogen atmosphere and held at this temperature for 1 hour to undergo a melting treatment. Simultaneously with the melting treatment, each predetermined amount of oxygen (shown in Table 1) was blown into the crucible through a lance, so that an oxidation treatment was performed in the melting step. In Comparative Example 1, the lance was placed 5 cm above the alumina crucible, and in Comparative Examples 2 and 3, the lance was placed inside the alumina crucible.

In Comparative Example 4, the same amount of the sample as in the examples was placed in an alumina crucible, and as in the examples, the sample was held at a temperature of 1,300° C. (as shown in Table 1) for 30 minutes by heating in an nitrogen atmosphere, while the predetermined amount of oxygen (shown in Table 1) was blown into the crucible through an alumina tube, so that a pre-oxidation treatment was performed. In Comparative Example 4, at the stage of the pre-oxidation step, part of the waste battery was molten so it adheres to the inner wall of the crucible, and so became impossible to remove, so that the following process became impossible to perform.

Each sample, except for that in Comparative Example 4, was then cooled in the furnace. After the cooling, the resulting slag and alloy were separated and recovered. Table 1 and FIG. 3 show the distribution ratios (% by weight) of metallic iron and metallic cobalt in the alloy, which were determined by analysis using the ICP method.

Table 1 and FIG. 3 show that metallic cobalt was more stably recovered into the alloy at a higher rate when the pre-oxidation step, in which the waste battery was oxidized by roasting in advance, was performed before the melting step than when the pre-oxidation step was not performed.

After the test in each of the examples, each slag was uniformly molten, and no carbon residue was observed on its surface. After the test in each of Comparative Examples 1 to 3, however, an unmolten part was left in each slag, and carbon was found to be present in the unmolten part.

This indicates that the pre-oxidation step enables reliable oxidation of carbon, which has been a challenge in stable recovery of valuable metals from waste batteries.

EXPLANATION OF REFERENCE NUMERALS

ST10 Waste battery pretreatment step
ST20 Pre-oxidation step
S20 Dry step
ST21 Melting step
ST22 Slag separation
ST23 Alloy separation
ST24 Exhaust gas treatment
ST25 Dephosphorylation step
ST26 Alloy shot-forming step
S30 Wet step
ST31 Dissolution step
ST32 Element separation step
1 Kiln
10 Kiln main body
11 Driving gear
12 Burner pipe
13 Feed inlet
14 Outlet

The invention claimed is:

1. A method for recovering a valuable metal from a waste battery, comprising:
    a pre-oxidation step comprising subjecting the waste battery to an oxidation treatment by roasting the waste battery; and
    a dry step comprising melting the waste battery after the pre-oxidation step to separate and recover slag and an alloy of valuable metals,
    wherein the pre-oxidation step is a step of roasting each component constituting the waste battery while kept unseparated, and performing the oxidation treatment to the extent that almost an entire amount of carbon contained in the waste battery is oxidized.

2. The valuable metal recovery method according to claim 1, wherein the pre-oxidation step is performed at 600° C. to 1,250° C.

3. The valuable metal recovery method according to claim 2, further comprising an additional oxidation step comprising performing an additional oxidation treatment in a melting step in the dry step.

4. The valuable metal recovery method according to claim 2, wherein a kiln is used in the oxidation treatment in the pre-oxidation step.

5. The valuable metal recovery method according to claim 2, wherein the waste battery is a lithium-ion battery.

6. The valuable metal recovery method according to claim 1, further comprising an additional oxidation step comprising performing an additional oxidation treatment in a melting step in the dry step.

7. The valuable metal recovery method according to claim 6, wherein a kiln is used in the oxidation treatment in the pre-oxidation step.

8. The valuable metal recovery method according to claim 6, wherein the waste battery is a lithium-ion battery.

9. The valuable metal recovery method according to claim 1, wherein a kiln is used in the oxidation treatment in the pre-oxidation step.

10. The valuable metal recovery method according to claim 9, wherein the waste battery is a lithium-ion battery.

11. The valuable metal recovery method according to claim 1, wherein the waste battery is a lithium-ion battery.

* * * * *